United States Patent [19]
Fukami et al.

[11] 3,730,175
[45] May 1, 1973

[54] ENDOSCOPE

[75] Inventors: Masaharu Fukami, Tokyo; Takeshi Okada, Hachioji-shi, Tokyo, both of Japan

[73] Assignee: Olympus Optical Co., Ltd., Tokyo, Japan

[22] Filed: Mar. 24, 1971

[21] Appl. No.: 127,536

Related U.S. Application Data

[63] Continuation-in-part of Ser. No. 869,070, Oct. 24, 1969, abandoned.

[52] U.S. Cl. ................................................128/6
[51] Int. Cl. .............................................A61b 1/06
[58] Field of Search.....................128/4, 5, 6, 7, 8, 128/9

[56] References Cited

UNITED STATES PATENTS

| | | |
|---|---|---|
| 2,764,149 | 9/1956 | Sheldon....................................128/6 |
| 2,987,960 | 6/1961 | Sheldon..................................128/6 X |
| 3,224,320 | 12/1965 | Knudsen..................................128/6 X |
| 3,244,167 | 4/1966 | Ferris et al. ...............................128/6 |

*Primary Examiner*—Lucie H. Laudenslager
*Attorney*—Otto John Munz

[57] ABSTRACT

Endoscope having a distal end portion connected through an elongated tube to a control housing so as to be inserted into a hollow portion of a living body for the inspection thereof. The distal end portion is provided with at least a light transmitting window such as a photographing or viewing window through which the light from an object is introduced into the distal end portion so that an image of the object is formed by an objective lens therein so as to be photographed or viewed. A plastic layer is fluidtightly provided on at least the area including the photographing or viewing window by the heat shrinkage or injection moulding of the plastic layer and an opening is formed in the plastic layer, the radially inwardly offset peripheral edge portion of which is snugly fitted in the light transmitting window, while a shoulder portion is formed in the inside of the inwardly offset peripheral edge portion along therewith. A transparent plate such as a glass plate is fitted in the shoulder portion with its peripheral edge portion firmly bonded to the shoulder portion. Alternatively, the plastic layer is made of a transparent material and the portion of the layer covering the photographing or viewing window is thickened so as to firmly fit in the window thereby providing a fluidtight transparent window.

7 Claims, 7 Drawing Figures

Patented May 1, 1973
3,730,175
2 Sheets-Sheet 1
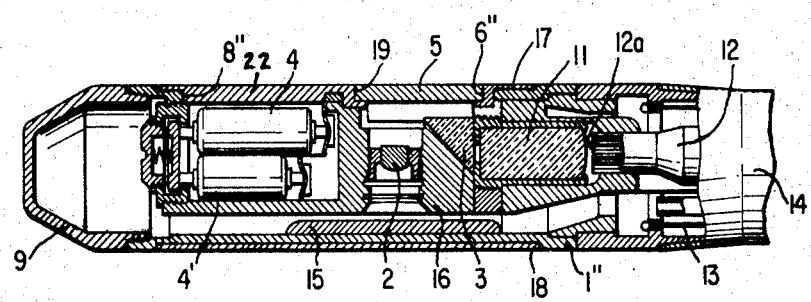
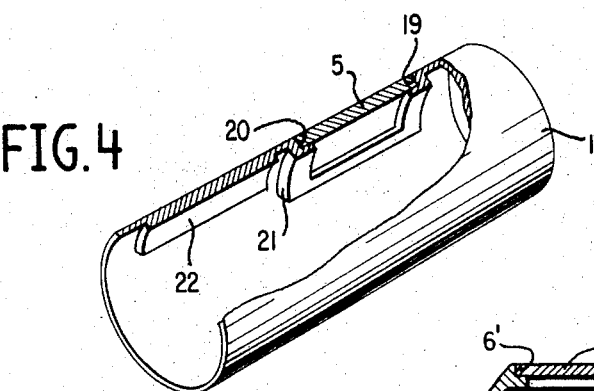
FIG. 2
PRIOR ART
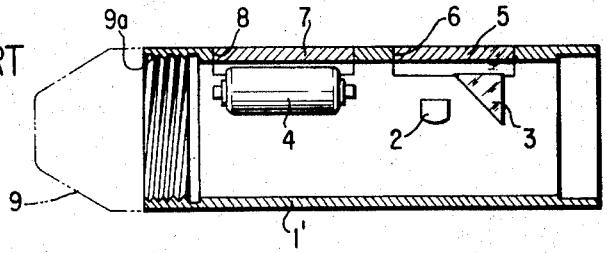
FIG. 1
PRIOR ART
INVENTORS
MASAHARU FUKAMI and
TAKESHI OKADA
BY
ATTORNEY Patented May 1, 1973

INVENTORS
MASAHARU FUKAMI, TAKESHI OKADA
BY
ATTORNEY

ENDOSCOPE

CROSS REFERENCE TO RELATED APPLICATION

This application is a continuation-in-part application of U.S. Ser. No. 869,070 filed by the same inventors as this application on Oct. 24, 1969, now abandoned.

BACKGROUND OF THE INVENTION

The present invention relates to an endoscope with its distal end portion which is adapted to be inserted into a hollow portion of a living body and the like being provided with at least a light transmitting window such as a viewing window or a photographing window in its peripheral wall, and more particularly to improvements in the distal end portion of an endoscope of the type described above.

In an endoscope in which an illuminating window and a photographing window are provided in the peripheral wall of the forward end portion or in which a viewing window is provided in the peripheral wall of the distal end portion solely or in addition to the photographing window referred to above, a transparent plate member such as a transparent glass plate is provided in the respective window so as to fluidtightly seal the same.

Heretofore, such a transparent plate member has been fitted in the window formed in the peripheral wall of the distal end portion with the peripheral edge portion of the transparent plate held in abutting relationship against the inner periphery of the window so as to be fluidtightly bonded thereto so that the transparent plate member is securely held in the window.

Since the outer diameter and the length of the distal end portion of the endoscope is severely limited in order to facilitate the insertion thereof into the hollow portion of a living body as well as for relieving the pain given to the living body by the insertion thereof, the peripheral wall of the distal end portion must be made very thin, thus rendering not only the bonding of the transparent plate member to the window to be very difficult but also the bonding to be very unstable so that there is always a danger of leakage of fluid when the distal end portion is inserted into the hollow portion of a living body.

In order to avoid the above disadvantages, it has been proposed to make the portion of the peripheral wall of the distal end portion around the window formed therein thicker than the remaining portion of the distal end portion so as to form a shoulder portion along the inner peripheral edge of the window so that the transparent plate member is securely bonded to the shoulder portion. However, such a construction renders the manufacture of the peripheral wall of the distal end portion to be very difficult and time-consuming thus resulting in a higher cost for the production thereof.

Further, the metallic wall of the distal end portion gives the living body uncomfortable feeling when the same is inserted into the inner hollow portion of the living body for the inspection.

The present invention aims at avoiding the above described disadvantages of the prior art endoscope.

SUMMARY OF THE INVENTION

An object of the present invention is to provide a novel and useful endoscope in which the above described disadvantages are avoided.

It is another object of the present invention to provide a novel construction of a distal end portion of an endoscope in which a transparent plate member is securely attached fluidtightly to a viewing or photographing opening formed in the peripheral wall of a plastic layer fixedly secured to the peripheral wall of the distal end position in at least the portion surrounding the viewing or photographing window of the distal end portion of the endoscope without the danger of causing the leadage of fluid when the distal end portion is inserted into a hollow portion of a living body to be inspected.

A further object of the present invention is to provide a novel construction of a distal end portion of an endoscope in which a transparent plastic layer is fixedly secured to the peripheral wall of the distal end portion in at least the portion surrounding a viewing or photographing window formed in the peripheral wall thereof and the portion of the plastic layer covering the window is thickened so as to firmly fit in the window thereby forming a fluidtight transparent window.

The above objects of the present invention are achieved in accordance with the present invention by providing plastic layer fluidtightly covering at least a part of the peripheral wall of the distal end portion including the viewing or photographing window formed therein, the plastic layer having an opening with its radially inwardly offset peripheral edge portion forming a shoulder portion being closely fitted in the window, and by fitting a transparent plate member in the radially inwardly offset peripheral edge portion of the opening formed in the plastic layer so as to be securely bonded thereto.

Since the transparent plate member such as a glass plate can be bonded more securely to the plastic layer than to the peripheral wall of the distal end portion made of a metallic material, the transparent plate member can be attached to the viewing or photographing window fluidtightly without the danger of causing detachment of the same by virtue of the shoulder portion formed along the peripheral edge of the opening in the plastic layer with which the peripheral edge of the transparent plate member is bonded.

The plastic layer may be formed in the cylindrical form located around and in contact with the peripheral wall of the distal end portion by thermal contraction or by injection moulding so as to closely contact with the peripheral wall fluidtightly.

In accordance with a further feature of the present invention, the plastic layer is made transparent and the area corresponding to the viewing or photographing window formed in the peripheral wall of the distal end portion is thickened so as to be closely fitted in the window so that a fluidtight transparent window is provided by the thickened portion.

Since the distal end portion is covered by the plastic layer, the endoscope affords the living body to which the endoscope is applied comforable feeling in comparison with a metallic wall of the distal end portion of the prior art.

BRIEF DESCRIPTION OF THE DRAWINGS

FIG. 1 is a fragmentary longitudinal sectional view showing the main parts of the distal end portion of a prior art endoscope;

FIG. 2 is a cross-sectional view showing the configuration of the peripheral wall of the distal end portion of another prior art endoscope and the transparent plate member attached thereto;

FIG. 3 is a fragmentary longitudinal sectional view showing an embodiment of the distal end portion of the endoscope constructed in accordance with the present invention;

FIG. 4 is a perspective view showing the plastic layer of FIG. 3 with a part broken away for illustrating the detailed construction of the same.

DETAILED DESCRIPTION OF THE PREFERRED EMBODIMENT

Figure 5:
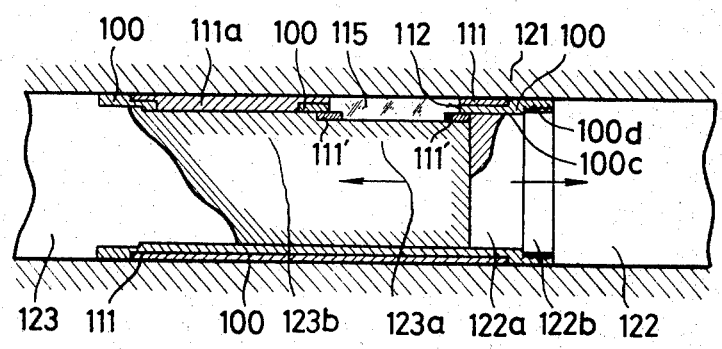
FIGS. 5 and 6 are fragmentary sectional views showing the manner how the peripheral wall of the distal end portion is produced by the injection moulding.

Prior to the description of the present invention, construction of several prior art endoscopes will be briefly described below with reference to FIGS. 1 and 2 for the better understanding of the present invention.

In FIG. 1 showing schematically one type of the distal end portion of the prior art endoscope which is connected to a control housing (not shown) through an elongated tube (also not shown) in the conventional manner, the distal end portion comprises a cylindrical peripheral wall 1' an objective lens 2 for focusing an image of an object to be inspected onto a film to be described later and a reflecting prism 3 for reflecting the light received from the object toward the distal end surface of an image transmitting optical system (not shown) such as a fiber optical system through an objective lens (also not shown) so as to form an image of the object on the distal end of the image transmitting optical system as well as a lamp 4 for illuminating the object.

As shown, a transparent plate member 5 is fitted in an opening 6 formed in the peripheral wall 1 in front of the objective lens 2 and the reflecting prism 3. The peripheral edge of the transparent plate member 5 is held in abutting relationship to the inner periphery of the opening 6 and securely bonded thereto so as to fluidtightly seal the interior of the peripheral wall 1 from the exterior thereof.

similarly, another transparent plate member 7 is fitted in an opening 8 formed in the peripheral wall 1 in front of the lamp 4. The peripheral edge of the transparent plate member 7 is held in abutting relationship to the inner periphery of the opening 8 and fluidtightly bonded thereto.

The inner face of the distal end of the peripheral wall 1 is provided with an internal thread 9a in which the external thread formed on a cap 9 is detachably threaded so as to close the distal end of the peripheral wall 1. The cap 9 is adapted to house therein a film cartridge (not shown) and a film (also not shown) loaded in the cartridge is drawn therefrom rearwardly across the optical axis of the objective lens 2 behind the same at an appropriate distance by a string means (not shown) connected at one end to the tip of the film and at its other end to a control mechanism provided in a control housing (not shown). Thus, the film is fed by one frame each time the string means is operated. The lamp 4 is energized for the photographing of the object each time the film is fed by one frame and the endoscope is operated for photographing the object so that the film is exposed so as to form an image of the object on each frame of the film.

The lamp 4 is normally energized for the observation of the object at a lower intensity than that for the photographing of the object. The image of the same formed on the distal end surface of the image transmitting optical system is transmitted therethrough to the rearward end so that the image is viewed through an eye-piece provided in the control housing.

As shown in FIG. 1, since the peripheral edge of each of the transparent plates 5, 7 is merely held in abutting relation to the inner periphery of each of the openings 6, 8 the thickness of which is very small, the bonding strength is very low, so that the transparent plates are easily detached from the respective openings thereby resulting in leakage of fluid into the distal end portion during the use of the endoscope.

In an alternative form of a prior art endoscope shown in FIG. 2, the area of the peripheral wall 1' around the opening 6' is thickened so as to form a shoulder portion 10 along the inner periphery of the opening, and the transparent plate 5' is fitted on the shoulder portion 10 so that not only the outer peripheral edge of the transparent plate 5' but also the inside surface thereof adjacent to the peripheral edge is securely bonded with the shoulder portion 10 of the opening. This construction is in fact advantageous in firmly securing the transparent plate without the danger of the detachment of the same from the opening. However, the mechanical working of the peripheral wall 1' having a partially raised portion around the opening as shown in FIG. 2 is very difficult and time-consuming thereby increasing the production cost.

In order to avoid the above described disadvantages of the prior art, the present invention provides a novel construction of the distal end portion of an endoscope as shown in FIGS. 3 and 4.

The general construction of the distal end portion shown in FIG. 3 is similar to that shown in FIG. 1. Therefore, the detailed description of the same is omitted except that two lamps 4, 4' each for the photographing and the observing of the object are shown and the objective lens 11 adapted to receive the light from the prism 3 and focus an image of and object onto the distal end surface 12a of the image transmitting optical system 12 are illustrated together with string means 13 for flexing the flexible tube 14 connecting the distal end portion to the control housing. Also, a pressure plate 15 is shown for urging the film drawn out from the film cartridge against the rearward end surface of a lens holding member 16 so as to locate the film at a proper distance from the objective lens 2.

In accordance with a characteristic feature of the present invention, a thin plastic layer 17 is provided fluidtightly around the peripheral wall 1''. The plastic layer 17 if fitted in a shallow annular groove 18 formed in the outer surface of the peripheral wall 1″.

The plastic layer 17 may be of a cylindrical form surrounding the entire peripheral surface of the wall 1″ or, alternatively, the plastic layer 17 may be provided fluidtightly on a portion of the peripheral surface including the openings 6″ and 8″ corresponding to the openings 6 and 8 in FIG. 1.

In case a cylindrical plastic layer 17 is used, the same may be loosely located around the peripheral wall 1″ and then contracted against the peripheral surface thereof by means such as thermal contraction so as to fluidtightly secure the plastic layer 17 onto the peripheral wall 1″.

The plastic layer 17 is provided with an opening 19 with an inwardly offset shoulder portion 20 formed along the inner peripheral edge thereof. The outer periphery 21 of the inwardly offset shoulder portion 20 is snugly fitted into the opening 6″ of the peripheral wall 1″, and the transparent plate 5 such as a glass plate or an acrylic resin plate is fitted in the shoulder portion 20 and firmly bonded thereto by means of a bonding agent.

Since the transparent plate 5 made of a material such as glass or acrylic resin can be bonded to the plastic layer 17 more firmly than to the the peripheral wall 1″ usually made of a metallic material, the construction of the present invention provides reliable sealing effect without the danger of detachment of the transparent plate 5 from the plastic layer 17.

Also, since the plastic layer provides a warm feeling to the living body to which the endoscope is applied in comparison with the metallic peripheral wall 1″, insertion of the distal end portion can be made easy while decreasing the unpleasant feeling of the living body.

In the similar way, a transparent plate may be provided in the opening 8″ of the peripheral wall 1″.

In accordance with a further feature of the present invention, the plastic layer 17 may be made transparent and the area corresponding to the opening 8″ is thickened inwardly to provide a thickened portion 22 which snugly fits within the opening 8″ so that the light from the lamp 4 or 4′ is freely passed therethrough to illuminate the object while the strength of the plastic layer 17 in the opening 8″ is sufficiently increased by the thickening of plastic the layer 17 in that region forming the thickened portion 22.

A thickened portion similar to the thickened portion 22 may be formed in the region of the opening 6″ instead of forming the opening 19 in which the transparent plate member 5 is fluidtightly fitted.

Figure 7:
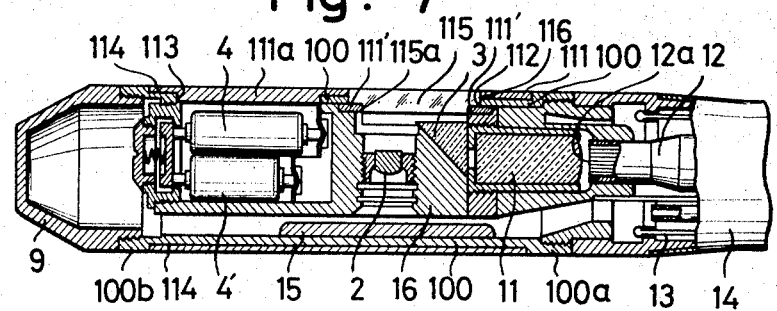
FIG. 7 is a fragmentary longitudinal sectional view similar to FIG. 1 but showing another embodiment of the present invention in which the distal end portion produced by injection moulding is incorporated.

FIG. 7 shows another embodiment of the distal end portion constructed in accordance with the present invention.

The wall 100 of the present invention is covered at least a portion thereof by a plastic layer 111 fluidtightly moulded integrally with the wall 100.

The wall 100 is generally in the form of a thin walled cylinder made of a metal or other suitable material and having an observing and/or photographing opening 112 and an illuminating opening 113. The outer surface of the portion of the wall 100 having the openings 112 and 113 is preferably made flat so as to facilitate the mounting of a transparent plate and to improve the optical performance of the endoscope as described later.

The outer peripheral surface of the wall 100 is formed with a shallow annular recess 114 except the respective end portions 100a and 100b thereof so that the plastic layer 111 is moulded in the annular recess 114 with the outer peripheral surface thereof being flush with the outer peripheral surface of the respective ends 100a and 100b.

A transparent plate 115 such as a glass plate having peripheral recessed portions 115a at its peripheral edges is fluidtightly secured at its peripheral edges to the inner peripheral edges of the opening 112 of the wall 100 and an opening 116 of the plastic layer 111 which is in register with the opening 112 while the peripheral recessed portions 115a are firmly secured to the plastic portion 111′ which will be described later so as to fixedly support the transparent plate 115 in position.

The portion 111a of the plastic layer 111 in register with the opening 113 of the wall 100 is thickened so as to snugly fit in the opening 113.

The plastic material forming the plastic layer 111 is made transparent so that the thickened portion 111a forms a transparent window for passing therethrough the illuminating light.

In conventional manner, a reflecting prism 3 and an objective lens 2 are located in the wall 100 behind the transparent plate 115 for receiving the light from the object through the transparent plate 115. The prism 3 reflects the light toward the objective lens 11 to form an image of the object on the front end surface 12a of the image transmitting fiber optical system 12 extending through the elongated tube 14 connected to the control housing and the image transmitted to the rearward end surface thereof is viewed through an eyepiece (not shown) in the control housing.

A photographing lamp 4 and an observing lamp 4′ are located in the wall 100 behind the thickened transparent portion 111a and selectively energized from the control housing so that the object is illuminated by the light from the lamp 4 or 4′ through the thickened portion 111a for the photographing or the observation of the object.

In order to photograph the object, a film cassette (not shown) is located in the cap 9 and the film stored therein is pulled out across the focal plane of the objective lens 2 defined by the pressure plate 15 by the string 13 extending through the elongated tube 14 and controlled from the control housing each time the film has been exposed by the lamp 4.

In accordance with another feature of the present invention, the plastic layer 111 is extremely efficiently formed around the wall 100 by a single moulding operation together with the fixing of the transparent plate 115.

Figure 6:
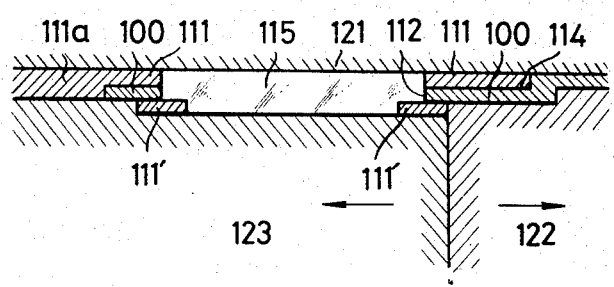

FIGS. 5 and 6 show how the plastic layer 11 is formed.

A main mould form 121 consisting of a mould block or a pair of mould halves has a generally cylindrical hole having the cross-section corresponding to the cross-section of the finished plastic layer 111 as well as the end portion 100a, 100b of the wall 100. A pouring gate (note shown) is provided in the mould form 121.

A pair of movable cores 122 and 123 are axially movably located in the hole of the form 121 in opposing relationship to each other.

The core 122 has the stepped distal end portions 122a, 122b having the cross-sections corresponding to the cross-section of the inner wall 100c and the inner diameter of the thread 100d of the wall 100, respectively, while the cross-section of the stem portion of the core 122 corresponds to that of the hole of the form 121.

Similarly, the cores 123 has the distal end portion 123a having the length corresponding to the distance between the outer ends of the two portions 111' and the cross-section corresponding to that of the portion of the inner surface of the wall 100 to which the transparent plate 115 is secured and an intermediate portion 123b having the cross-section corresponding to that of the portion of the inner surface of the wall 100 at which the thickened portion 111a of the plastic layer 111 is to be formed, while the cross-section of the stem portion of the core 123 corresponds to that of the hole of the form 121.

As seen by the arrows shown in FIGS. 5 and 6, the core 122 and the core 123 are movable in the opposite directions apart from each other from the positions shown in which the cores 122, 123 abut against each other.

In operation, the transparent plate 115 is preliminarily bonded to the opening 112 temporarily by a bonding agent and located in the hole of the moulded form 121. The core 122 is inserted into the hole of the form from the right while the core 123 is inserted into the hole from the left so that the two cores 122, 123 abut against each other as seen in FIG. 5. In this position, the spaces indicated by 111 and 111' as well as by 111a in FIG. 5 are left hollow so as to be filled with the plastic material for forming the plastic layer of the present invention.

Then, the transparent plastic material is poured into the spaces indicated by 111, 111' and 111a by injection moulding operation through the pouring gate previously described, so that the plastic material filled in the spaces 111, 111' and 111a solidifies to form the plastic layer 111 fluidtightly covering the wall 100 and the portions 111' firmly securing the transparent plate 115 in position as well as the thickened portion 111a integrally secured to the opening 113.

Thereafter, the cores 122 and 123 are moved in opposite directions apart from each other and removed from the wall 100, and the wall 100 securely fixing thereon the plastic layer 111 and the transparent plate 115 is removed from the mould form 121. Thus, the finished product is instantaneously obtained by a simple injection moulding operation in accordance with the present invention. The distal end portion of the endoscope can be constructed by arranging in the thus finished wall 100 the various elements as shown in FIG. 7.

In the embodiment described above, a separate transparent plate 115 is provided in the opening 112 of the wall 100. However, the transparent plate 115 may be dispensed with and, instead, a thickened portion similar to the thickened portion 111a in the opening 113 may be formed in the opening 112.

Also, a transparent plate similar to the transparent plate 115 may be provided in the opening 113 instead of the thickened portion 111a.

Further, the embodiments described above are shown as having two objective lenses, one for the photographing while the other is for the observation. However, the objective lens 2 may be dispensed with together with the pressure plate 15, the film cassette and the string for pulling the film out of the cassette by the control from the control housing, and, instead, a camera capable of operating like a single lens reflex camera may be provided in the control housing so that the image transmitted through the image transmitting optical system 12 can be observed and photographed by the operation of the camera.

The distal end portion of the endoscope of the present invention is advantageous in the following points:

a. Fluidtightness of the wall of the distal end portion is insured by the moulding of the plastic layer integrally moulded with the wall.

b. The plastic layer covering the wall of the distal end portion gives the living body to which the endoscope is applied comfortableness which can not be afforded by a conventional metallic wall of the distal end portion of the prior art endoscope.

c. The production cost of the distal end portion can greatly lowered.

We claim:

1. In an endoscope including a control housing, an elongated tube, and a distal end portion connected to said control housing through said elongated tube so as to be inserted into a hollow portion of living body and the like to be inspected by said endoscope, said distal end portion being provided in its peripheral wall with at least a light transmitting window such as a viewing window or a photographing window, plastic layer member fluidtightly covering at least a part of said peripheral wall of said distal end portion including said light transmitting window, said plastic layer member having an opening and a radially inwardly offset peripheral edge portion, said radially inwardly offset peripheral edge portion of said opening forming a shoulder portion being closely fitted in said light transmitting window, and a transparent plate member being fitted in said radially inwardly offset peripheral edge portion of said opening and fluidtightly bonded thereto.

2. In an endoscope, according to claim 1, wherein said transparent plate member is a glass plate.

3. In an endoscope, according to claim 1, wherein said transparent plate member is a plate made of acrylic resin material.

4. In an endoscope, according to claim 1, wherein an illuminating window is provided in the peripheral wall of said distal end portion in addition to said light transmitting window, and said plastic layer member is made of a transparent plastic material and is provided with a thickened transparent portion which is closely fitted in said illuminating window so that the light is transmitted outwardly therethrough for illuminating the hollow portion into which said distal end portion is inserted.

5. In an endoscope, according to claim 1, wherein said plastic layer member is in a cylindrical form completely surrounding the peripheral wall of said distal end portion.

6. In an endoscope, according to claim 5, wherein said plastic layer member is integrally moulded with said wall so as to fluidtightly cover said wall at least partially thereof around said opening.

7. In an endoscope, according to claim 6, and having an illuminating opening in addition to said first mentioned opening in said cylindrical wall, said plastic layer member having two thickened transparent portions each fluidtightly fitting with said openings in said wall so as to provide transparent windows, respectively.

* * * * *